United States Patent [19]
Palin et al.

[11] 3,936,621
[45] Feb. 3, 1976

[54] DESTRUCTIBLE TYPE SWITCH HAVING FRANGIBLE CONDUCTIVE ELEMENT

[75] Inventors: Alfred Palin; John Wesley Slack, both of Runcorn, England

[73] Assignee: Imperial Chemical Industries Limited, London, England

[22] Filed: Oct. 15, 1974

[21] Appl. No.: 515,018

[30] Foreign Application Priority Data
Oct. 17, 1973 United Kingdom............... 48271/73

[52] U.S. Cl............................... 200/61.08; 200/300
[51] Int. Cl.² ..................... H01H 35/00; H01H 9/02
[58] Field of Search .......... 200/61.08, 300; 340/421

[56] References Cited
UNITED STATES PATENTS
| | | | |
|---|---|---|---|
| 3,751,613 | 8/1973 | Inose et al. ...................... | 200/61.08 |
| 3,793,498 | 2/1974 | Matsui et al. ................. | 200/61.08 X |
| 3,822,369 | 7/1974 | Kunczynski...................... | 200/61.08 |
| 3,853,199 | 12/1974 | Hirashima et al............ | 200/61.08 X |
| 3,859,482 | 1/1975 | Matsui et al...................... | 200/61.08 |

Primary Examiner—James R. Scott
Attorney, Agent, or Firm—Cushman, Darby & Cushman

[57] ABSTRACT

A detector comprises a brittle support for an electrical conductor adapted to fit adjacent a closure (e.g. a bursting disc) so that when failure occurs, electrical continuity in the conductor is broken by fracture of the support and cannot be fortuitously remade.

9 Claims, 6 Drawing Figures

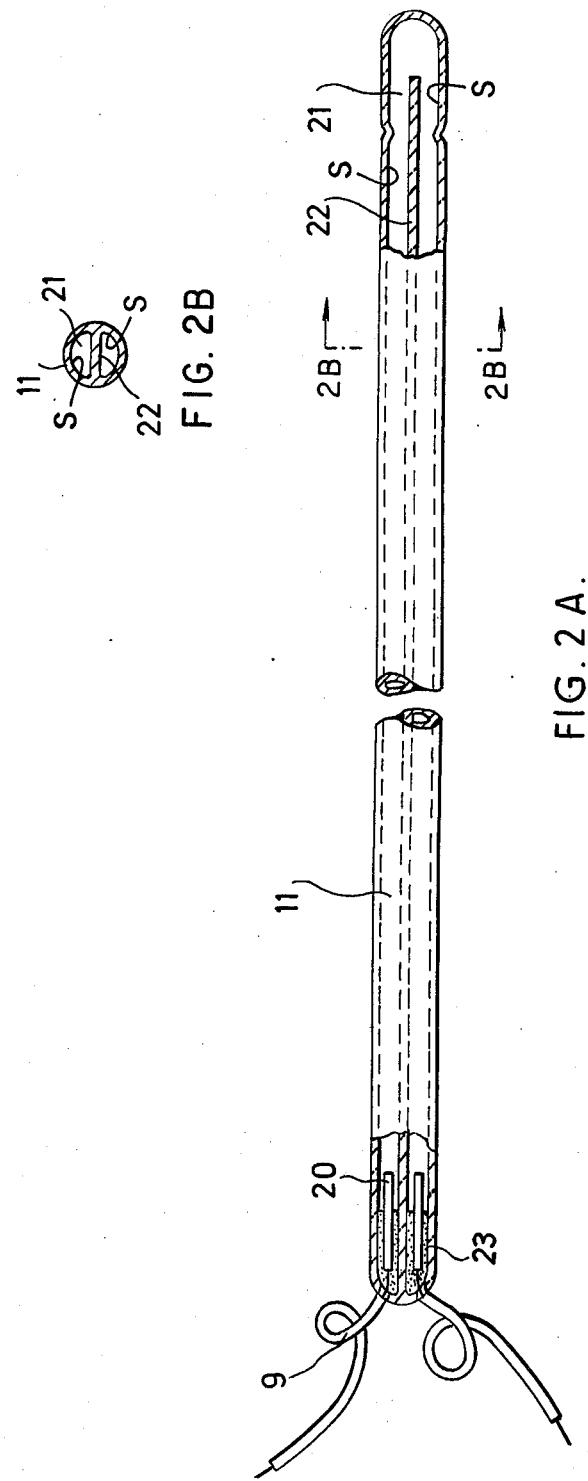

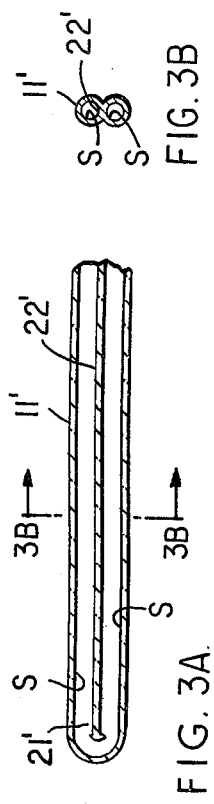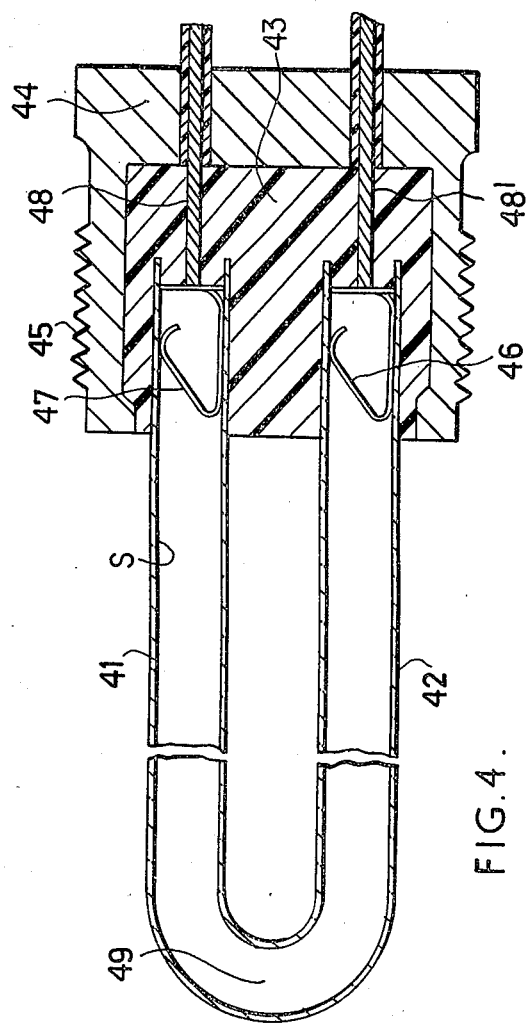

DESTRUCTIBLE TYPE SWITCH HAVING FRANGIBLE CONDUCTIVE ELEMENT

This invention relates to a device for detecting the failure of closures for example closures on chemical reaction vessels.

BACKGROUND OF THE INVENTION

The pressure inside any vessel may at times become excessive and cause closure failure, defined as an event caused by the internal pressure of the vessel resulting in the opening of the closure. The closure may be for example a conventional lid, stopper or safety-valve or a seal formed by a film, disc or plate supported across an aperture of the vessel. If it is important to know when the closure failure has occurred, perhaps to apply an automatic reclosure mechanism or to take other appropriate action a failure-detector is placed in the vicinity of the closure. A common form of closure particularly on chemical reaction vessels, because they are prone to generate excessive pressures unexpectedly, is a closure known as a bursting-disc. The failure-detectors are often used in combination with bursting discs so that immediately a dangerous condition occurs inside the vessel and the bursting disc is ruptured, the failure-detector detects the rupture and generates an appropriate signal for example a signal which will alert an operator or automatically shut down the reaction which is being carried out.

SUMMARY OF THE INVENTION

According to the present invention there is provided a detector for the detection of a failure in a closure member, operable by the breakage of an electrical circuit to detect the said failure, comprising a brittle electrical conducting element supported between electrical terminals in a manner such that when any part of the conducting element or the support thereof fractures into a plurality of fragments, electrical continuity between the terminals is broken and the fragments cannot dispose themselves in any way which restores the electrical continuity under the conditions consequent upon the failure.

The brittle electrical conducting element may be for example a brittle electrically conducting material preferably graphite, or it may be a thin layer of conducting material attached to or otherwise supported by a brittle non-conducting material, for example a layer of metal deposited on a fragile substrate. Suitable metals may be for example aluminium, gold, silver or copper and suitable substrates may be for example glass, porcelain or brittle plastic e.g. polystyrene. The fragile substrate may be in the form of a convenient carrier e.g. a strip, slide, plate, rod or tube. The substrate preferred is glass and especially preferred is a glass substrate in the form of a tube. The closure member may be for example a lid, stopper, safety valve or seal and a common form of seal especially on chemical apparatus is a bursting disc. In order to detect the failure the detector is placed adjacent to the closure member in such a position that when the failure occurs, defined as the 'opening of the closure', the detector will fracture; depending on the particular design of closure member this position may be inside or outside a vessel holding the closure member.

The electrical conducting element preferably comprises a brittle tubular support having deposited thereon a layer of conducting material (e.g. a thin metal layer) the layer being deposited preferably on an internal surface of the tubular support.

Two electrical terminals carrying electrical leads are arranged to make contact with the layer of conducting material so that an electrical conducting path would extend over a substantial portion of the surface of the support when current is passed between the terminals.

The tubular support may be of any convenient shape but it has been found that supports with a cylindrical form externally over a portion of their length are the most convenient for attachment to a vessel because a cylindrically-shaped portion may be fitted easily into a sealed unit for example by means of a gland. Thus an electrical-conducting element comprising a support of this form may be arranged to extend as a finger across the aperture to be covered with the closure member. In this embodiment either the layer of conducting material on the support or the support itself is formed so that a U-shaped conducting path is produced extending from the terminals at one end of the finger so that the bend of the U-shape may be situated in a place which ensures fracture of the support and/or discontinuity in the conducting path once the closure fails.

The electrical terminals may be placed in any convenient position for electrical connection to the conducting element. For example the terminals may be placed on the closure or on the body of the vessel being closed and electrical connection made when the conducting element is placed in position on its support. The setting-up of a brittle element can be a tedious and delicate operation and thus we find it preferable to construct both the terminals and the electrical-conducting element on a single assembly (preferably both terminals connected to one end of a conducting element which is substantially cylindrical or finger-shaped as described above) so that the whole assembly including the brittle conducting element may be conveniently placed on or attached to one side of the vessel so as to protrude across the opening covered by the closure member.

If fracture of any part of the conducting element occurs the conducting path between the terminals is broken and the fractured pieces of the brittle materials move apart and contact cannot be remade even by the fortuitous collision of any of the fractured pieces.

In order to set up the detector once more for detection of a fresh failure of the closure (normally a fresh bursting disc must be fitted to the vessel) a new conducting element complete with terminals is required to be fitted across the opening adjacent the closure member. The advantage of arranging both terminals on one end of the finger-shaped element is that a single support only on the vessel is required and no tedious alignment of the brittle conducting element between two supports is necessary. In fact if the U-shaped conducting path is formed inside a glass finger having a substantially cylindrical external cross-section this may be slid into position through a circular hole from the outside without disturbing other fittings or attachments to the vessel.

Since many chemical reactor vessels are required to withstand corrosive materials and very often extreme weather conditions, it is advantageous for the terminals and the electrical conducting path of the brittle conducting element to be protected from corrosive materials. The detector operates more reliably if the conducting path is prevented from corrosive attack or even from moisture condensation because these would tend to produce an earth-leakage path for the current which could cause the electrical continuity between the terminals to be maintained in the event of a fracture of the detector. The terminals and other external electrical connections may be covered with a protective covering but we prefer to protect the conducting material with the support itself by depositing the metal layer on the inside surface of the brittle support, most conveniently a glass tubular member permanently sealed at the ends.

BRIEF DESCRIPTION OF DRAWINGS

A preferred embodiment of the invention will be described with reference to the FIGS. 1 and 2. FIG. 2A is an elevation of the brittle conducting element and FIG. 2B is a sectional view of taken on the line 2B—2B. FIG. 3A is a longitudinal sectional view of another embodiment of a conducting element and FIG. 3B is a sectional view taken on the line 3B—3B. FIG. 4 is a sectional view of another embodiment of the detector.

DESCRIPTION OF PREFERRED EMBODIMENTS

Figure 1:
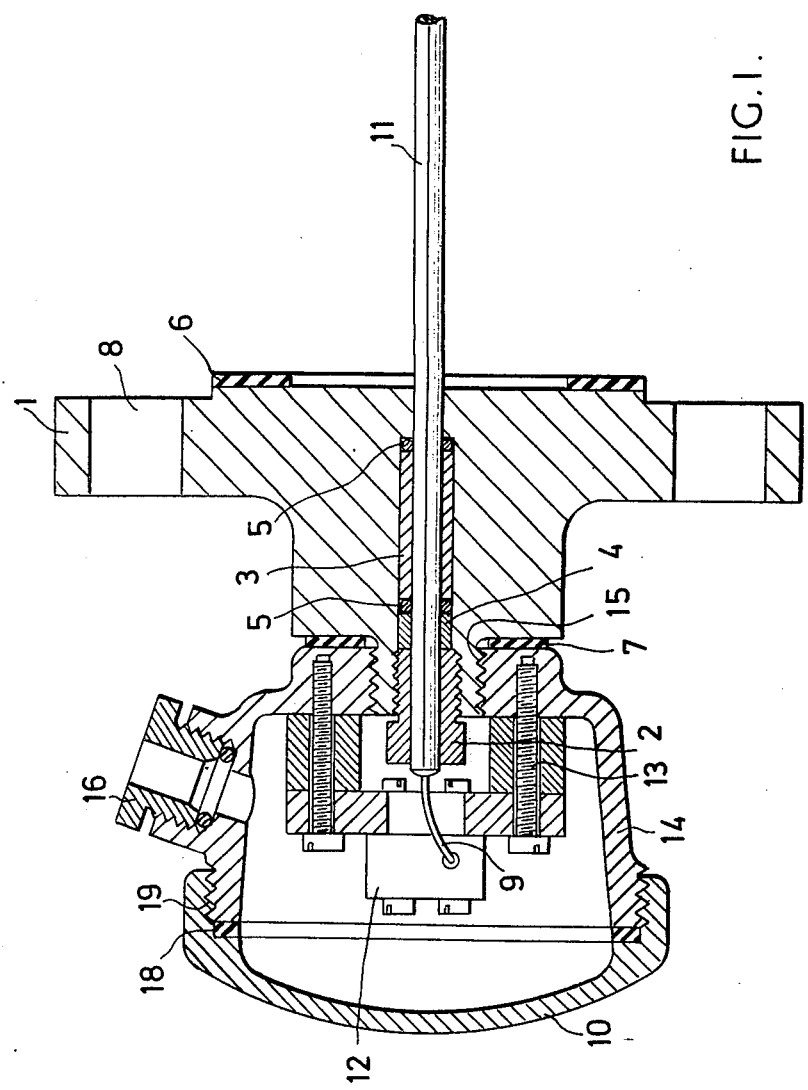
FIG. 1 is a sectional view of the whole detector.

A flanged metal disc 1 has a central bore in which a cylindrical glass probe 11 is a sliding fit. The metal disc 1 is designed to clamp on to a mating flange (not shown) on a reaction vessel by means of bolts (not shown) passing through holes 8, the mating flanges being sealed by a flexible jointing ring 6. A gland is formed by O-rings 5 either side of a sleeve 3 fitting closely over glass element 11.

A gland nut 2 bored to accept the glass probe 11 holds neck-ring 4 in place to seal the gland and is threaded to screw into the flanged disc 1. Sleeved wires 9 from the glass probe are secured in a terminal block 12 held within a protecting cup 14 supported by threaded portion 15 to the metal disc 1 the connection thereto being sealed by a sealing ring 7. The terminal block 12 is protected from external conditions by a cover 10 screwed to an external thread 19 on cup 14 and sealed thereto by a flexible ring 18.

External electrical wires (not shown) are connected to terminal block 12 entering the cup 14 through a pinchgland 16. The wires 9 are permanently connected to a deposit of silvers on the inside of the glass probe 11 shown in detail on FIG. 2. The glass element consists of two tubes of hemicircular cross-section formed from one tube by sealing a longitudinal diametric plate of glass 22 inside the tube. Each hemicircular tube is completely silvered internally and the silver coating of each tube is connected independently to one wire of the terminal wires 9 by connectors 20 sealed into the glass tubes with a cement 23. The silver coating of each hemicircular tube is connected together at the end 21 of the probe 11 because the central plate 22 stops short of the tube end 21.

In use an electrical connection is made through the wires 9 to the connectors 20 and thence along the silver coating of each hemicircular tube and the circuit is made by the joining of the silver conducting layer at the end 21 of the glass element. The glass probe is supported adjacent to the closure which it is intended to monitor (e.g. a bursting disc on a piece of apparatus) so that when there is a failure of the closure (e.g. a bursting-disc rupture) the glass probe suffers fracture. Immediately fracture occurs of any part of the glass probe, electrical connection is broken between each of the connectors 20 and cannot be remade because the fracture causes a section of the glass element to break off carrying the silver coating with it.

The glass element may be constructed in other shapes carrying an internal metallised surfaces, for example a normal cylindrical tube 11' bent into a U-shape preferably so that the arms of the U are in contact along their whole length 22' as shown in FIG. 3. The embodiment described above and shown in FIGS. 1 and 2 has the advantage of a circular external cross-section which may be sealed easily to the side of a reaction vessel by means of a normal gland. Brittle elements having other cross-sectional shapes may conveniently be fitted into a cylindrical sleeve in order to fit a normal gland if desired.

A further preferred embodiment is shown in FIG. 4. The parallel arms 41, 42 of a glass U-tube of circular cross-section are bedded into a resinous cement 43 which fills a cavity inside a protective metal cap 44 of circular cross-section threaded externally at 45 to screw into a mating threaded aperture (not shown) in a reaction vessel or other apparatus. The internal surfaces of glass arms 41, 42 are silvered at S and spring connectors 46, 47 make electrical contact inside each arm with the layer of silver. Electrical leads 48, 48' pass through the protective cap 44 and the cement 43 and each make contact with one of the spring connectors in order to provide an electrical circuit along each of the arms 41, 42 and round the bend 49 of the U-tube. The electrical leads may be either insulated, flexible, low voltage leads passing through holes in the protective cap 44 or rigid contactor pins sealed into, but insulated from, the metal of the protective cap by means of a non-conducting material, for example glass.

What we claim is:

1. A detector for the detection of a rupture of a closure member, operable by the breakage of an electrical circuit to detect the said failure, comprising a U-shaped brittle electrical conducting element having its ends supported in a housing and the U-shaped portion protruding from said housing, electrical leads extending through the wall of said housing and making electrical contact with said ends of said brittle conducting element, means mounting said housing adjacent a rupturable closure member in vessel in a position such that the protruding U-shaped portion of said brittle conducting element is disposed in a place which ensures fracturing of said portion upon rupture of the closure member whereby when said portion fractures into a plurality of fragments, electrical continuity between the electrical leads is broken and the fragments cannot dispose themselves in any way which restores the electrical continuity under the conditions consequent upon the failure.

2. A detector according to claim 1 wherein the electrical conducting element is a layer of metal deposited on a U-shaped glass substrate.

3. A detector according to claim 2 wherein the glass substrate is in the form of a tube.

4. A detector according to claim 3 wherein the tube is coated on an internal surface with a layer of metal.

5. A detector according to claim 1 wherein the electrical conducting element comprises a brittle tubular support having deposited thereon a layer of conducting material.

6. A detector according to claim 5 wherein the layer of conducting material is deposited on an internal surface of the tubular support.

7. A detector according to claim 5 wherein the tubular support has a cylindrical form externally over a portion of its length.

8. A detector according to claim 5 wherein the conducting material is a metal.

9. A detector according to claim 8 wherein the metal is silver.

* * * * *